Sept. 14, 1926.

F. C. MOCK 1,600,007

FUEL SEPARATOR AND VAPORIZER

Filed Oct. 15, 1923    7 Sheets-Sheet 1

Fig.1.

Witnesses:
Harry R. L. White
W. P. Kilroy

Inventor
Frank C. Mock,
By Brown, Boettcher & Dienner
Attys

Sept. 14, 1926.  
F. C. MOCK  
FUEL SEPARATOR AND VAPORIZER  
Filed Oct. 15, 1923   7 Sheets-Sheet 4

1,600,007

Inventor  
Frank C. Mock  
By Brown, Boettcher & Dienner  
Attys.

Sept. 14, 1926.  
F. C. MOCK  
1,600,007  
FUEL SEPARATOR AND VAPORIZER  
Filed Oct. 15, 1923  7 Sheets-Sheet 5

Inventor  
Frank C. Mock  
By Mason Boracker  
Attys.

Sept. 14, 1926.　　　　　　　　　　　　　　　　1,600,007
F. C. MOCK
FUEL SEPARATOR AND VAPORIZER
Filed Oct. 15, 1923　　　7 Sheets-Sheet 7

Fig. 10

Witnesses
Harry W. White
W. P. Kilroy

Inventor
Frank C. Mock.
Brown, Boettcher & Dienner
By　　　　　Attys.

Patented Sept. 14, 1926.

1,600,007

UNITED STATES PATENT OFFICE.

FRANK C. MOCK, OF CHICAGO, ILLINOIS, ASSIGNOR TO STROMBERG MOTOR DEVICES COMPANY, OF CHICAGO, ILLINOIS, A CORPORATION OF ILLINOIS.

FUEL SEPARATOR AND VAPORIZER.

Application filed October 15, 1923. Serial No. 668,483.

The present invention relates to an improved construction of fuel separator and vaporizer adapted to be introduced between the carburetor and the intake ports of an internal combustion engine.

It is becoming increasingly apparent, day by day, that the common gasoline now available for motor car propulsion cannot be evaporated when mixed with air of ordinary temperature, except by the application of heat. Without such application of heat, the fuel puddles in the intake manifold at low air velocity and flows irregularly and intermittently to the different cylinders resulting in irregular firing of the engine, and many other disadvantages. At air velocities approximately above 75 feet per second in the intake manifold, any fuel upon the walls is kept in rapid motion and the puddling under ordinary circumstances does not take place, regardless of the temperature.

It has been found that without great difficulty, heat may be applied to the intake manifold wall to evaporate and boil away the liquid fuel which accumulates thereon, but this application of heat presents certain disadvantages. The heat imparted to the fuel in boiling it off the manifold wall is afterwards communicated to the air component of the mixture charge, which air component is thereby expanded to a certain degree and the weight thereof entering the cylinder reduced, with a consequent reduction in power. The disadvantages resulting from this condition are not so material when the cooling system of the engine is practically unlimited in capacity. In the ordinary automotive engine equipment, however, the heat dissipating capacity under many conditions of operation is not much more than adequate. If no heat is applied to the fuel charge on the intake stroke and the fuel not evaporated in the intake manifold, the evaporation of the fuel in the cylinder during the intake and compression stroke reduces the temperature of the charge and of the cylinder. Whatever heat is imparted to the fuel charge before it enters the cylinder reduces the cooling action just referred to and results in a higher temperature during the compression, combustion and exhaust strokes, with the result that the engine runs considerably hotter, the tendency toward detonation is increased and the temperature of the engine cooling system rises. This temperature rise has a cumulative effect in that it produces a higher temperature under the hood or in the engine compartment, a higher air temperature entering the carbureter and surrounding the intake system, and an increased radiation from the exhaust pipe, all of which tend toward further expansion of the intake charge, increased detonation and less favorable conditions of lubrication in the engine itself. I wish to emphasize that these detrimental effects occur when the engine is working at high speed and full power, when the heat dissipating capacity of the cooling system is working to the limit, and at a time when the air velocity in the intake manifold is high enough to carry and distribute the fuel through the cylinders properly without the application of heat to the charge. On the other hand, when the air velocity in the intake manifold is relatively low corresponding to low engine speeds, and of insufficient velocity to carry and properly distribute unheated fuel to the cylinders, if heat is applied to the intake charge at this time it will be dissipated by the cooling system without the extreme temperature rise previously described.

It will be apparent from the foregoing observations that it is more desirable to heat the fuel charge at the low air velocities than at the high air velocities, or in a relative sense, to heat the fuel charge more intensively at the low air velocities. This is one of the principal objects aimed at in devising the present form of separator and vaporizer.

Another object of the invention is to provide a construction of fuel separator and vaporizer which will achieve the above object without the necessity of moving parts.

Another object is to provide a design of a mixture passageway which will avoid the centrifugal stratification of the mixture stream tending to occur at the bends and elbows, particularly at the higher engine speeds when the separating and vaporizing chamber is heating a relatively smaller percentage of the fuel. This centrifugal stratification is caused by the heavier particles of fuel being thrown to the outer strata of the high velocity mixture stream when rounding bends or elbows in the manifold, and this action oftentimes segregates the fuel, or a large part thereof, into a veritable miniature river flowing around the outside of the bend. In the rapid and spasmodic changes of flow which occur in the manifold of a multi-cylinder engine, this segregation obviously results in an uneven fuel feed to the different cylinders. This centrifugal stratification I avoid by forming each of the elbows of generally streamline curvature to the end of obtaining a stream line flow around the elbow and re-entry of any separated fuel particles back into the main body of the mixture stream by a projection of these particles diagonally back into the center of the stream. A co-operative effect is secured between the present fuel separator and vaporizer unit and the streamline or re-entrant curves because the separator and vaporizer unit vaporizes the wet fuel and retains the mixture in a substantially homogeneous condition during low engine speeds, and the improved form of streamline or re-entrant curves retain the mixture supplied to the cylinders in a substantially homogeneous condition during the higher engine speeds.

Referring to the accompanying drawings wherein I have illustrated a preferred embodiment of my invention—

Figure 1:
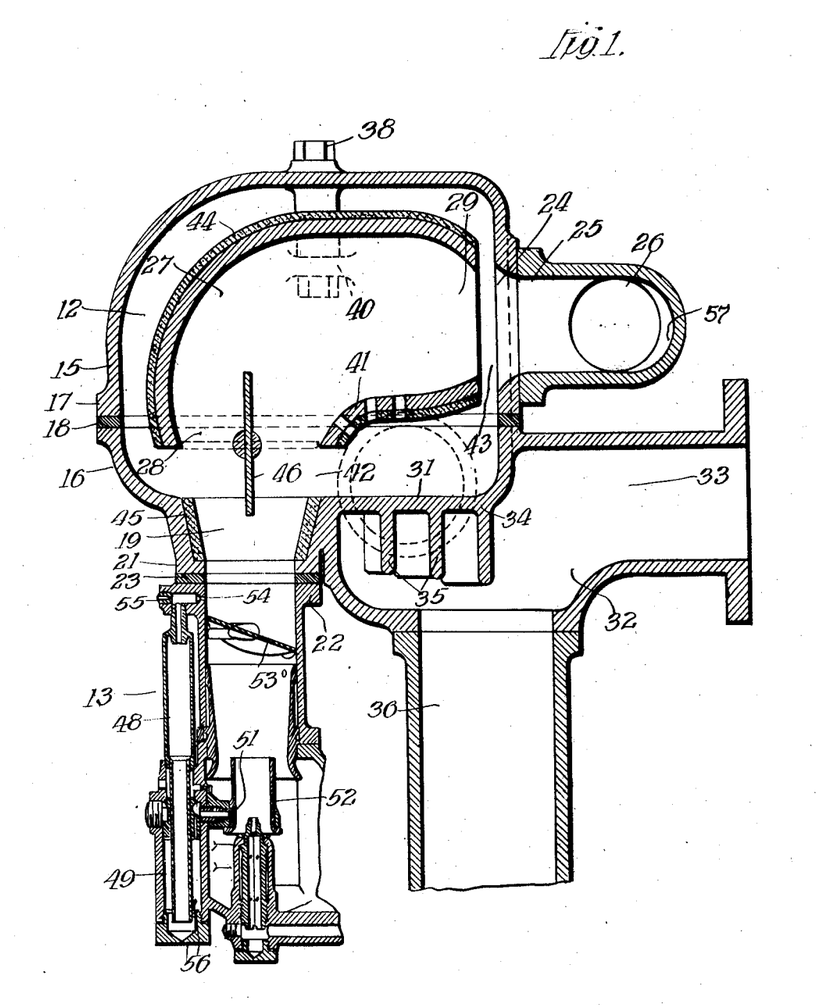
Figure 1 is a vertical sectional view of one form of my improved separator and vaporizer illustrating an accelerating well carbureter operating in conjunction therewith.

The fuel separating and vaporizing chamber illustrated in Figure 1 is broadly designated 12 and is embodied in the mixture passageway at a point between the carbureter 13 and the mixture ports in the engine block with which the intake manifold connects. The chamber, as shown in this figure, is constructed of upper and lower castings 15 and 16 which are bolted together through adjoining flanges 17, a gasket of relatively thick heat insulating material 18 being preferably interposed between the flanges of the casting to prevent the ready conduction of heat to the upper casting 15. The lower casting 16 is provided with a substantially vertical intake 19 having a bolting flange 21 adapted to have connection with the flange 22 of the carbureter 13. A relatively thick heat insulating gasket 23 is also preferably interposed between the flanges 21—22 to prevent the conduction of heat from the casting 16 to the body of the carbureter 13. The outlet 24 from the chamber 12 occurs through the side wall of the upper casting 15, and communicates with the lateral central port 25 of an intake manifold conduit 26. The intake manifold 26 is bolted to the upper casting 15 in any suitable manner.

Fuel separation occurs primarily in a separating bend 27 which is supported in the chamber 12 with its inlet 28 in substantial alignment with the chamber inlet 19 and carbureter barrel, and with its outlet 29 in substantial alignment with the outlet port 24 of the chamber and lateral port 25 of the manifold. I shall describe the construction and operation of this separating bend presently. The major portion of the fuel which is separated therein is precipitated down upon an inclined vaporizing surface 31 consisting of the lower wall of the bottom chamber casting 16. For heating this vaporizing surface an exhaust chamber 32 is formed in the lower casting 16 below this surface. Exhaust gases are admitted to this chamber 32 through the central inlet port 33, adapted for bolting connection to a pair of exhaust ports in the engine block, and through the lateral extensions 34 of an exhaust manifold adapted to make connection with end exhaust ports in the engine block. A plurality of staggered ribs 35 project downwardly from the under side of the vaporizing wall 31 in position to receive the full blast of the exhaust gases from the central port 33 and the lateral exhaust passages 34. The exhaust gases are discharged from the chamber 32 through an outlet conduit 36 leading to the muffler.

The fuel separating bend 27 is a tubular conduit spaced at the ends and sides from the walls of the chamber 12 and having the gradual curvature of an elbow. The bend is supported in the chamber 12 in substantially the position shown in any suitable manner, such as by the provision of screws 38 extending down from the top of the casting 15 and passing through ears 40 on the bend. The interior of the bend 27 may be provided with a plurality of internal ribs for collecting fuel, or may be of smooth contour. When fuel collecting ribs are employed they are preferably disposed transversely of the flow of the mixture stream, and, if desired, they have a slight forward inclination towards the inner side of the bend so that the forward velocity of the mixture stream will tend to wipe the fuel particles inwardly along the ribs to the inner part of the bend. Gravity is the primary force tending to move the collected fuel particles inwardly towards the inner part of the bend, but as above described, this may be assisted by using the motion of the mixture stream.

The tendency of the mixture to centrifugally stratify its different components when rounding a bend such as indicated at 27, will cause the heavier fuel particles of the mixture to fly out and impinge against the outer wall of the bend 27 where these heavier fuel particles gravitate down out of the bend. It will also be observed that the diameter of the bend 27 is considerably larger than that of the bore of the carbureter 13, and of the entrance 19, which naturally results in a lower velocity of the mixture stream as soon as it enters the relatively larger area of the bend. This reduced velocity, of course, also has a separating action in that the heavier fuel particles which are supported sheerly by velocity are precipitated in the bend by such diminution of the velocity.

The fuel collecting along the inner wall of the bend 27 drains out through a plurality of apertures 41 in this inner wall and drops upon the fuel vaporizing surface 31. The fuel that is vaporized on this highly heated surface rises in gaseous form and re-enters the mixture stream through the ports 41, or through the passageways 42 and 43 at the ends of the bend 27. Any fuel remaining unvaporized on this surface 31 flows laterally and over the lip of the inlet opening 19 down into the mixture stream rising from the carbureter. Here, or at some point in the carbureting chamber, these fuel particles are again picked up by the mixture stream and carried up into the bend 27 where they are broken up and carried through into the intake manifold 26, or are separated out and again returned to the vaporizing surface 31.

The entire casting 16 will become comparatively hot if the vaporizing surface 31 is highly heated, since except for the cooling effect of the mixture stream, which does not occur in the present invention, and the cooling effect of the outer air, there is nothing to prevent the casting 16 from rising to the full temperature of the exhaust. To prevent the radiation or conduction of an undue amount of heat to the bend 27, which will overheat the main volume of the mixture, I provide a protecting sheet 44 of the insulating material around the outer sides of the bend. This heat insulating jacket has perforations cut therein in continuation of the ports 41 so as not to interfere with the drainage of the separated fuel back onto the vaporizing surface 31. Another expedient which I contemplate for reducing the heating effect of the separating bend 27 is to construct the bend of a heat refractory material. Glazed porcelain is exemplary of such a material, this having low receptivity to radiant and conducted heat. A bushing or thimble 45 of heat insulating material is also preferably set into the inlet opening 19 to the chamber 12, so that the heat in that portion of the casting 16 surrounding this intake opening will not unduly heat the main body of mixture. This bushing may be slightly tapered to secure a gradual reduction in velocity of the mixture stream upon entering the chamber 12. The provision of the heat insulating gaskets 18 and 23 effectively insulates the heated casting 16 so that neither the carbureter 13 nor the upper casting 15 will become heated to such a point that they might undesirably heat the main body of mixture.

As I have hereinbefore stated, the foregoing design of fuel separator and vaporizer has the selective action of separating and vaporizing a large percentage of the liquid fuel during the low engine speeds, and only separating and vaporizing a relatively small percentage of the fuel during the higher engine speeds. The reason for this appears to be as follows: At low air velocities of the charge coming from the carbureter the fuel spray adheres to the walls of the carbureter barrel and intake 19, the low air velocity being insufficient to whip or tear these fuel particles off the walls, and consequently, the fuel is wiped upwardly to the upper lip of the inlet 19 where it spreads laterally onto the vaporizing surface 31. At the higher velocities the fuel particles are traveling at such high velocity that they break off of the upper lip of the intake 19 and are carried through the bend without separation. A further separating action results from the fact that at low speeds the drops coming from the carbureter are of larger size than at high speeds and consequently have greater centrifugal weight. Similarly to the action occurring in the intake 19, when the air velocity through the bend is low, it will not sweep fuel deposited on the walls of the bend out into the intake manifold 26 but will precipitate such fuel down through the opening 43. At high air velocities the fuel particles are whipped directly into the manifold 26. I have found by considerable and lengthy experimentation that completeness of separation at low speeds is assisted by increasing the area and reducing the air velocity in the separating bend or around the bend in substantially the following proportions. When separation is desired, the velocity should not exceed 20 to 25 feet per second; consequently, the area of the passageway through the separating bend or elbow should be about three times that of the intake manifold beyond, so that the velocity of the mixture through the separating chamber will not exceed 25 feet per second until the velocity in the manifold beyond the chamber has reached a value of approximately 75 feet per second, so that no further separation or puddling will take place in the intake manifold. The separation in the elbow is, of course, assisted by the use of unclearly defined bends and the formation of eddy spaces which are provided with downward drains more or less screened from the strong draft of the main mixture current. To avoid separation at high air velocity, one of the principal factors is that the opening 43 from the separating elbow to the outlet of the chamber be considerably less than the opening 42 between the entrance of the chamber and the separating elbow. This is in order that the pressure in the chamber itself outside the elbow be closely that of the air stream entering the elbow. I have found that if the pressure of the surrounding chamber be somewhat lower than that of the air entering the elbow, (due, for example, to the existence of a large space between the outlet of the elbow and the outlet of the chamber) there will be a tendency for some of the mixture at high speed to avoid passing through the elbow, particularly in view of the sharp turn in the elbow employed for fuel separating purposes, and this body of the mixture will circulate around the outside of the elbow within the chamber. Under this condition considerable fuel will be deposited on the walls of the main chamber. I have found by experiment with separating elbows or bends on the general character disclosed in the present application, that with ordinary motor gasoline at 70° F., approximately 70% of the fuel in the normal mixture delivered by the carbureter will be precipitated down on the vaporizing surface at low engine speeds (this corresponding to a manifold air velocity of below 75 feet per second) and at high engine speeds as low as 18% of the fuel is precipitated down on the vaporizing surface. Considering that the fuel so separated out and thrown down on the vaporizing surface will in operation come off of the vaporizing surface as a vapor at anywhere from 250° F. to 400° F., it can easily be seen that there will be a pronounced difference in the amount of heat imparted to the intake charge at low and high speeds.

I have found that by virtue of this selective action of separating and vaporizing different proportions of the fuel in accordance with changes in air velocity there is practically no tendency for the fuel to puddle or collect in the intake manifold 26—provided this is of proper design—because at the low speeds all the fuel that will separate has already done so in the chamber 12, and at high speeds the air velocity through the manifold will not permit the fuel to puddle or collect in the manifold. An additional selective heating effect is also present at low engine speeds depending upon the temperature of the air entering the carbureter. Just after starting, when the air and fuel are cold, a large percentage of the fuel will enter the air stream in an unvaporized condition, and consequently, will be separated out at the bend 27 and precipitated down upon the vaporizing surface 31. After the engine has been driven a while and the temperature under the engine hood has arisen appreciably, more fuel will be vaporized in the carbureter in the atomizing action of the fuel nozzle, and consequently less fuel will drop down on the vaporizing surface 31. In this regard, I contemplate the use of a butterfly valve 46 at the entrance of the bend 27 for expediting the process of warming up the engine. The closure of this valve to the dotted line position indicated compels the mixture to flow out around the bend 27 into intimate contact with the heated walls of the casting 16, with the result that the entire volume of the mixture takes on a higher temperature. The provision of such a controlling valve is optional, as desired.

Due to the small but perceptible interval of time required for the separated fuel to drain down onto the vaporizing surface 31, to vaporize thereon, and to thereafter reenter the main body of mixture, there is a small lag in the development of the vaporized fuel charge when the throttle is suddenly opened. Compensation is made for this lag, however, by the use of an accelerating well in the carbureter 13, which, by emitting a considerably increased volume of fuel, supplies an adequate quantity of fuel which will be carried through the bend to cover the interval during which the other separated fuel is being vaporized and returned to the mixture stream. This accelerating enrichment is preferably of only momentary duration, but it is sufficiently long to cover this period of separation and vaporization. A very efficacious form of accelerating well for securing this co-operative action is the U-tube, suction fed type of well disclosed in my prior Patent No. 1,325,233. I have illustrated such a well embodied in carbureter 13, but for brevity of description I shall only describe this well briefly, attention being directed to the foregoing patent for any particulars of construction. The well comprises the vertical tube 48 extending down into a lower chamber 49. The upper end of the chamber 49 has communication through an accelerating jet 51 opening into the carbureting chamber through the lateral wall of the inner venturi 52. This accelerating jet is above the normal fuel level, and an air bleed thereto normally prevents the issuance of fuel therefrom, or reduces the quantity of fuel discharging from this jet. The upper end of the tube 48 communicates with the carbureting chamber above the throttle 53 through a suction port 54, the upper end of this tube also having a restricted atmospheric inlet 55. Fuel is admitted to the chamber 49 from the float chamber through a restricted orifice 56. When the throttle 53 is in a restricted position, the suction effective through the port 54 raises the fuel in the tube 48 to an elevated level, and when the throttle is thrown open the suction effective through the port 54 is diminished, with the result that the raised quantity of fuel in the tube 48 drops and rises in the tube 49 for issuance from the accelerating jet 51.

Figure 2:
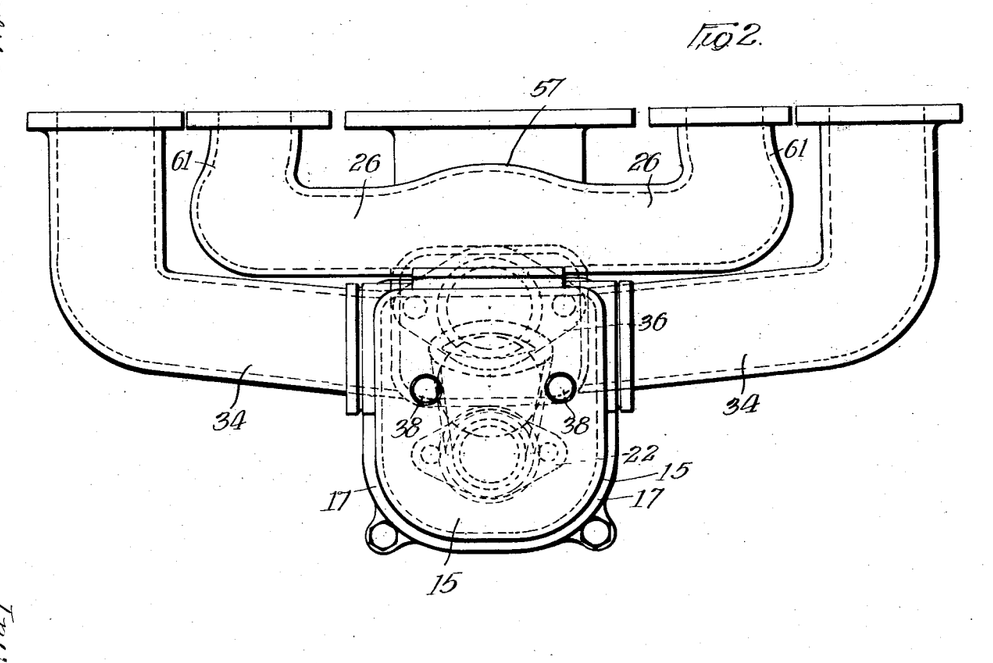
Fig. 2 is a plan view of the above on a smaller scale, this plan view illustrating streamline elbows of hyperbolic contour at the ends of the intake manifold.

Having secured the proper vaporization and distribution of fuel in the mixture by the foregoing separating and vaporizing action occurring in the chamber 12, it is now necessary to keep the fuel charge, which exists as a combination of vapor, mist and spray entrained in the air charge, from separating or changing its distribution relative to the air charge in the manifold 26 between the chamber 12 and the engine cylinder ports 14. Referring now to Fig. 2, it will be observed that with the common type of multi-cylinder engine, the first bend encountered is usually in the form of a T existing at the junction of the inlet 25 and the lateral branches of the manifold 26. In the ordinary form of T the fuel particles sweep outwardly under their own inertia and stratify along the outer walls of the lateral branches. I have found that by swelling out the top of the T and then introducing a reverse curvature (relative to the general direction of the stream beyond the bend) as shown at 57, the fuel particles can be thrown back again towards the center of the stream so as to again secure an even distribution of the fuel particles in the fuel stream and avoid condensation along the outer walls of the manifold. In the ordinary arrangement on an engine, there is only a small percentage of the time that flow takes place through both branches of the T at the same time; most of the time the flow is through one side only and there is an eddy current in the other leg in the T. The definite configuration of such an eddy is improved by having a relatively sharp corner between the lateral inlet opening 25 and the cross part of the T passage; but the centrifugal force and also the resistance of the bend to air flow can be reduced by increasing the area and lowering the velocity through the practice of expanding or swelling the passage coming into the T.

The next mixture disturbing element in the flight of the mixture is the L-shaped bend at each end of the manifold 26. Here again, I have utilized the principle broadly disclosed in the case of the T connection and the reversely curved portion 57, shown in the center of the manifold in Figure 2. Each bend is preferably enlarged slightly in diameter over that of the straight portion of the manifold, and, if desired, the bend may be given a streamline conformation defined by conjugate hyperbolic curves. Irrespective of the particular size or shape of the curve, one of the important features is the re-entrant curve 61 which operates to deflect any fuel particles which have been thown out to the outer strata of the mixture stream back into the center of the stream for an even distribution therethrough.

Figures 3, 4:
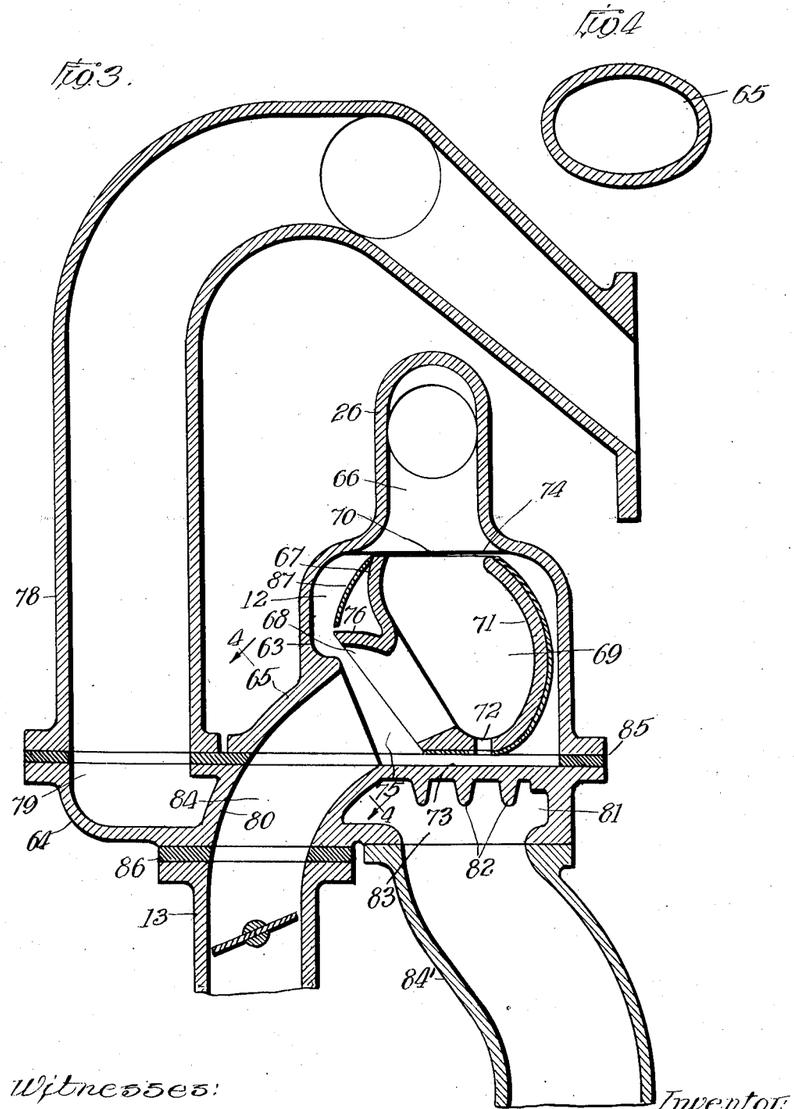
Fig. 3 is a vertical sectional view of another form of my improved fuel separator and vaporizer.
Fig. 4 is a detail sectional view taken on the plane of the line 4—4 of Fig. 3.
Figure 5:
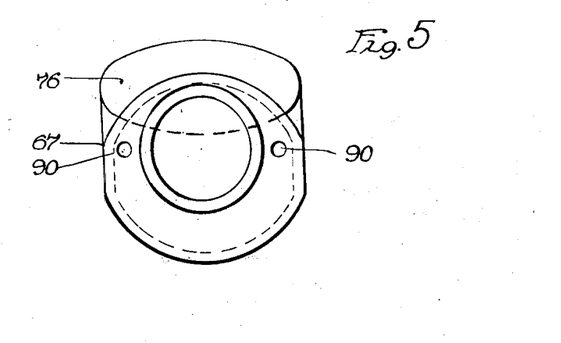
Fig. 5 is a detail plan view of the fuel separating bend removed from the device.

Referring to the form shown in Figure 3, it will be noted that the separating and vaporizing chamber 12 is defined substantially entirely within an upper casting 63 which is adapted to have bolted connection to a lower heating casting 64. The inlet to the chamber 12 is through a curved passageway 65 entering the chamber diagonally, and the outlet from the chamber is through the vertical passageway 66 extending up to the intake manifold 26. The fuel separating bend consists of an elbow 67 having a relatively large flaring opening 68 aligned substantially with the end of the inlet passageway 65. This enlarged inlet opening 68 is reduced slightly for discharging across a separating chamber 69 having a generally spherical rear wall 71. The general configuration of this separating elbow is best shown in Figs. 3 and 5. The area or capacity of the chamber 69 is considerably larger than that of the entrance passageway 65, so that the mixture upon entering the chamber 69 drops off in velocity. The fuel particles striking on the spherical surface 71 in this region of reduced velocity tend to drain down under gravitational force to the bottom of the chamber 69 where they pass out through the port 72 onto the vaporizing surface 73. The space 74 between the outlet end of the elbow 67 and the manifold opening 66 is smaller than the space 75 between the inlet opening of the elbow and the inlet passageway of the separating chamber so that a more rarefied condition will prevail in the separating elbow 67 than in the chamber area 12 surrounding the elbow. The lip formed by the overhanging flange 76 assists in directing the fuel particles into the spherical chamber 69.

The exhaust gases are conducted through a conduit 78 which bolts onto the casting 64 in communication with an inlet port 79.

Figure 6:
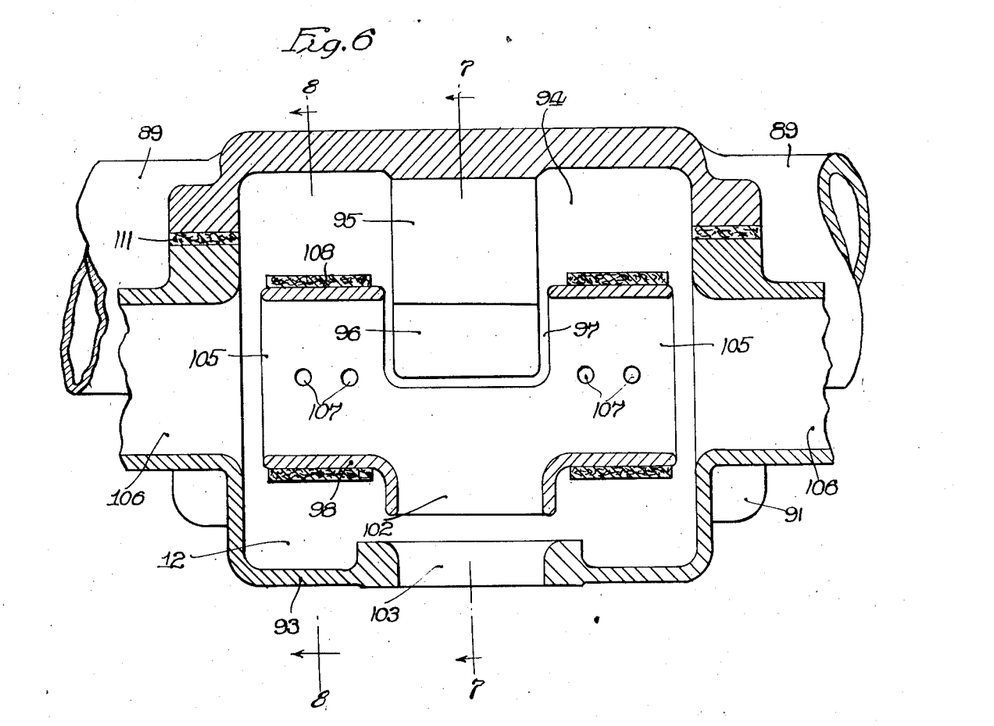
Fig. 6 is a substantially horizontal sectional view of another form of my invention.
Figures 7, 8:
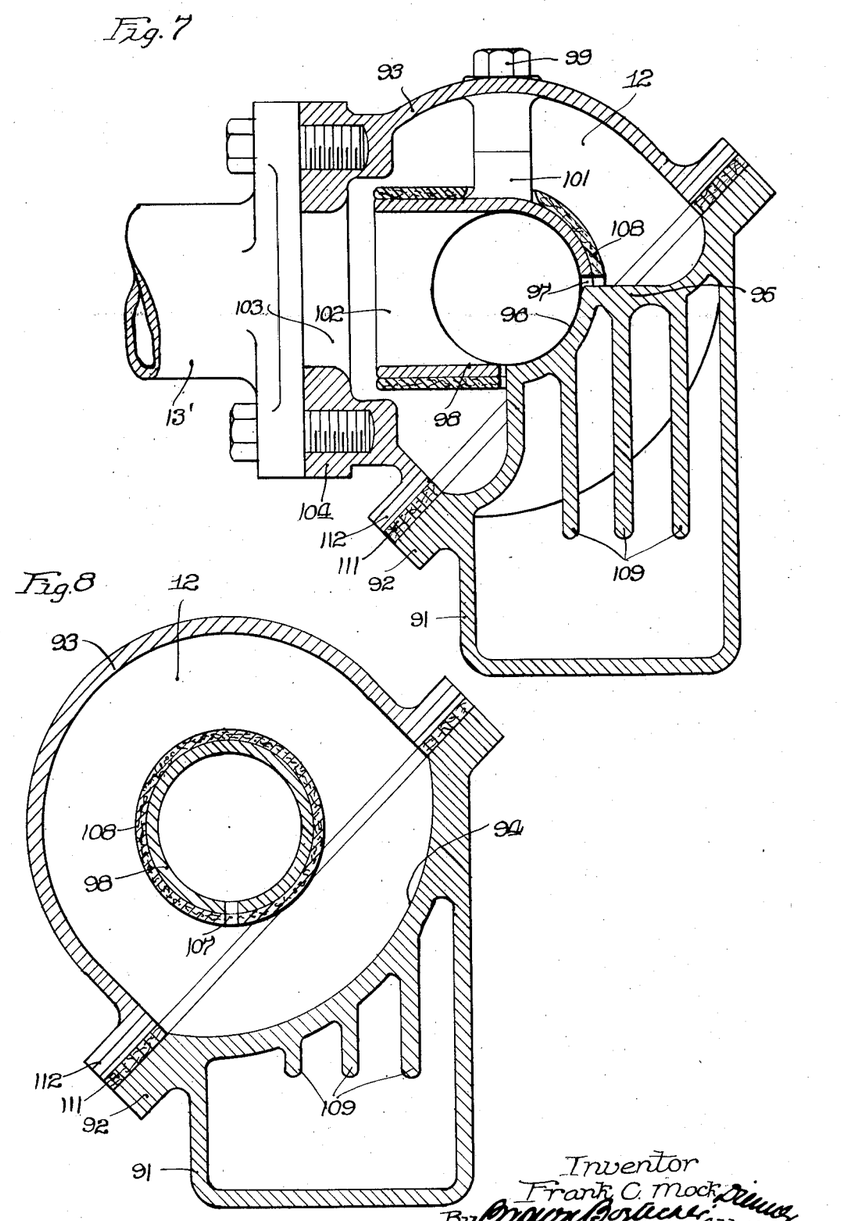
Figs. 7 and 8 are vertical sectional views taken approximately on the planes 7—7 and 8—8 of Figure 6 respectively.

The gases are then passed horizontally through the chamber 81 into heating contact with a plurality of ribs 82 formed on the underside of the vaporizing surface 73, after which the gases are passed downwardly through the outlet port 83 into a conduit 84' leading either to the main exhaust manifold or back to the exhaust muffler. The mixture is conducted from the carbureter 13 up through a curved passageway 84 leading up through the exhaust gas chamber 81. The walls of this passageway 84 will receive a heat which will assist to some extent in securing a quick vaporization of some of the fuel particles in the main volume of mixture and in the accelerating charge. I contemplate the use of an accelerating well in conjunction with the carbureter 13 for securing the benefit hereinbefore described. The curved wall 80 of the passageway 84 functions as a preliminary hot spot, which assists in vaporizing the fuel particles of both the main charge and the accelerating charge. This hot spot also assists in the selective action heretofore described as it breaks up into drops and vapor, any film of fuel moving upwardly thereon so that these drops are whipped into the air stream at the higher engine speeds. Heat insulating gaskets 85 and 86 are interposed between the casting 64 and the chamber 63 and the carbureter 13 respectively to prevent the conduction of heat to these latter parts. The bend may be constructed of porcelain or other heat refractory material, or a heat insulating jacket 87 may be placed over the same to prevent the undue heating of this part. The separating elbow 67 may be supported in the chamber 12 by supporting screws 70 passing down through the top of the casting 63 and tapping into holes 90 in the top of the elbow. The T and elbow formations described in the preceding embodiments are preferably embodied in the present intake manifold 26. In Figures 6, 7 and 8, I have have shown the embodiment of my separating bend in the T portion of the intake passageway. In this disclosure I have also illustrated the adaptation of my invention to the horizontal type of carbureter, although it will be obvious that the embodiment may be readily adapted to use with the vertical type of carbureter as well. The exhaust manifold is indicated at 89, and it will be observed from Figures 7 and 8 that a heating chamber 91 is cast integral with this exhaust manifold at its central part by forming the chamber 91 substantially co-extensive with the run of the manifold, but dropped slightly below the plane thereof. The upper edge of the heating chamber 91 is formed with a bolting flange 92 disposed on an incline, as best shown in Figs. 7 and 8, for receiving the generally cylindrical cover 93 forming the fuel separating and vaporizing chamber 12. The upper wall of the heating chamber 91 is given a concave curvature, as indicated at 94 to complete the substantially cylindrical chamber 12. In the center of the concave wall 94 is formed a raised portion 95 having the curved hot spot or vaporizing surface 96 formed in the upper corner thereof. This enlarged portion 95 projects into a rectangular slot 97 cut out in the lower outer side of the fuel separating T 98.

This T is suspended substantially concentrically in the housing cover 93 by a plurality of screws 99 extending down through this housing cover and tapping into bosses 101 formed on the upper side of the T. The inlet opening 102 of the fuel separating T 98 is in direct alignment with an inlet port 103 in the front wall of the cylindrical housing 93. A bolting flange 104 is formed around this inlet port 103 for receiving the bolting flange on the end of the horizontal carbureter 13'. The branch outlets 105 of the T align with the lateral branch portions 106 of the intake manifold.

The fuel separated out in the T 98 is either vaporized by contact with the arcuate hot spot 96, or is precipitated down through the slot 97 for vaporization on the curved vaporizing wall 94. The hot spot 96 provides a vaporizing surface for the lighter and more readily vaporized fuel particles; such separated fuel particles as are not vaporized by a momentary contact with this hot spot descending down onto the wall 94 where they remain in continued subjection to a vaporizing heat until they are completely gasified. The lower wall of the two branch outlets 105 may be provided with additional drain apertures 107. A heat insulating jacket 108 surrounds the separating T 98. In order that the hot spot 96 and the vaporizing surface 94 will reach a vaporizing heat quickly and remain at a high temperature, a plurality of heat absorbing ribs 109 are formed integral with the underside thereof and extend down into the exhaust heating chamber 91. A heat insulating gasket 111 is also interposed between the flange 92 on the heating chamber 91 and the flange 112 on the cylindrical housing portion 93. Because of the eddy current separation occurring in this T it is not necessary to enlarge the diameter of the T, although this may be done if desired.

Figure 9:
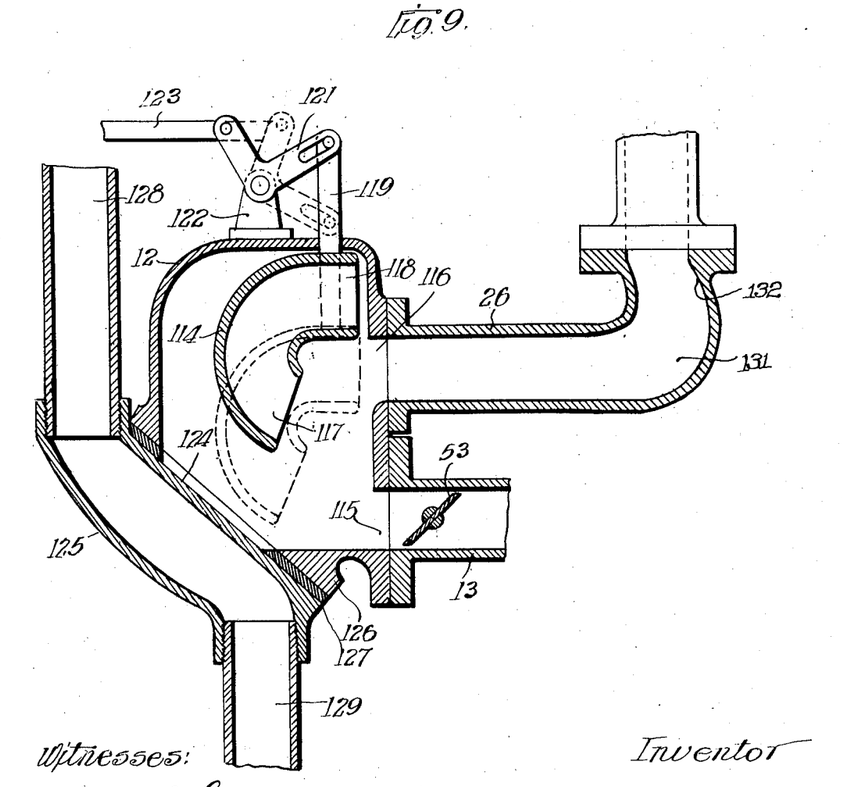
Fig. 9 is a vertical sectional view of another form of my invention, employing a movable elbow, this figure also illustrating the streamline elbow in co-operation therewith.

In Figure 9 I have illustrated an embodiment wherein the separating bend is movable into and out of separating position. The separating bend is in the form of an elbow 114 which is mounted for vertical reciprocation in the fuel separating and vaporizing chamber 12. The horizontal carbureter chamber 13 discharges through a lower intake opening 115 in the chamber 12. The intake manifold 26 connects to an outlet port 116 which is arranged directly above the inlet port 115. The separating bend 114 has a diagonal intake opening 117, and an outlet opening 118. When the bend or elbow is in its upper position, as indicated in full lines, the opening 118 is out of register with the port 116 and the opening 117 is out of register with the inlet opening 115, so that the bend or elbow is practically non-effective for receiving any of the mixture and performing a fuel separating function therein. When in its lower position, as indicated in dotted lines, however, the outlet port 118 is substantially in register with the port 116, and the inlet opening 117 is in the path of the mixture sweeping in through the inlet port 115 so that the major volume of the mixture passes through the separating elbow. The elbow may be raised and lowered in any suitable manner, such as by the provision of the stem 119 extending out through an opening in the top of the chamber 12 for pivotal connection to one arm of a bell crank lever 121. This bell crank lever is pivotally supported upon a bearing pedestal 122 and has pivotal connection at its other arm with an operating rod 123 adapted to extend to the dash, or to any other suitable control. For example, the raising and lowering of the separating bend 114 could be arranged to follow concurrently with the opening and closing of the throttle 33 in the carbureter 13; or, the control rod 123 may be connected to any suitable control button on the dash.

The fuel vaporizing surface 124 consists of the inclined forward wall of a heating chamber 125. The lower and rear corner of the separating and vaporizing chamber 12 is cut away, the opening being provided with a marginal flange 126 to which the heating chamber 125 is bolted. As in the preceding embodiment, a heat insulating gasket 127 is preferably interposed between the flange 126 and the heating chamber 125 to prevent the conduction of heat to the main housing of the fuel separating chamber. The exhaust gases are conducted to the chamber 125 through a pipe 128 and are exhausted therefrom through the pipe 129. The separating bend 114 may be provided with a heat insulating jacket, if desired.

It will be observed that the present location and arrangement of the vaporizing surface 124 enables it to function as a preliminary hot spot for the heavy fuel particles in the normal volume of mixture and in the accelerating charge, particularly when the separating elbow 114 is raised; and this vaporizing surface is also enabled to function as a vaporizing surface for the fuel separated out in the bend or elbow 114. It will be observed that the motion of the air stream in passing through the chamber 12 will tend to wipe the fuel particles up along the vaporizing surface so that they will be widely distributed thereon for quick vaporization.

I have shown the intake manifold 26 as having a streamline elbow 131 embodied therein for preventing centrifugal stratification at the bend of the manifold. The streamline curvature of the elbow is so designed as to give a re-entrant curve or slope to the upper outer wall of the bend, as shown at 132 for deflecting the outer strata of fuel particles back diagonally across the mixture stream for an even diffusion of the fuel particles in the mixture stream.

Figure 10:
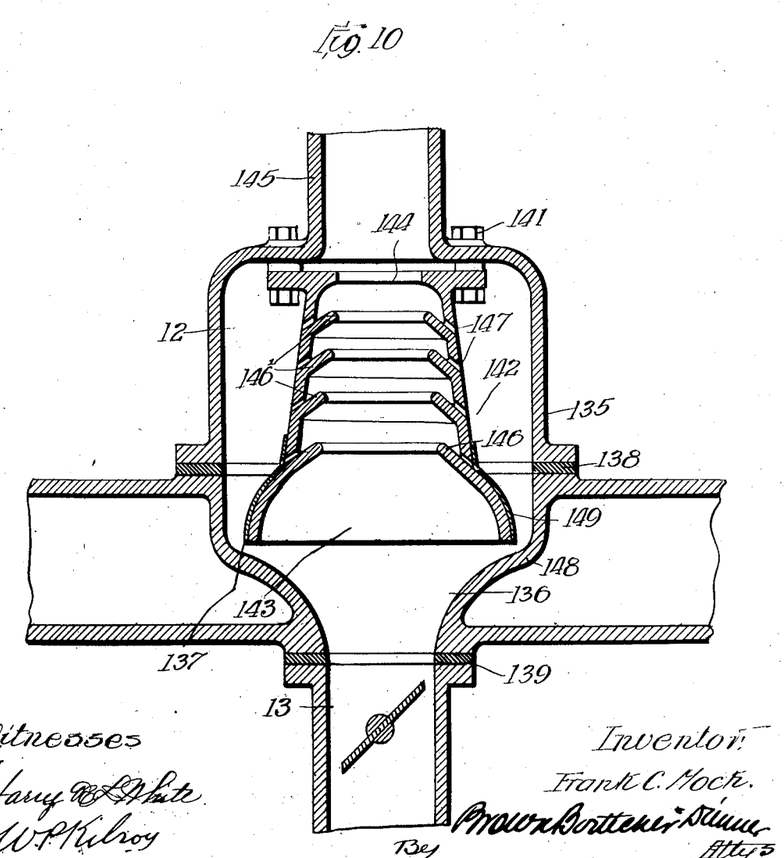
Fig. 10 is a vertical sectional view of another form of my invention.

In Figure 10 I have shown a modification in which fuel separation occurs by a reduction in velocity of the mixture stream as by passing the mixture stream through as enlarged fuel separating chamber of doubly tapered form having fuel collecting ribs thereon. The fuel separating and vaporizing chamber 12 is formed by an upper dome-shaped casting 135 and a downwardly tapered passageway or chamber 136 extending through the exhaust manifold or heating chamber 137. The casting 135 is bolted to the upper end of the passageway 136, a heat insulating washer 138 being interposed between the casting 135 and the heating chamber 137 to prevent undue heating of the casting 135. The carbureter 13 is bolted to the lower end of the passageway 136, a similar heat insulating gasket 139 being interposed therebetween to also prevent the heating of the carbureter 13.

Suitably supported by screws 141, or by any other preferred means in the chamber 12 is a fuel separator 142 of generally tapering form. This separator has its inlet end 143 aligned axially with the carbureter outlet 13, and has its outlet end 144 aligned substantially axially with the intake manifold 145 extending from the upper end of the casting 135. The inlet end 143 is of outwardly flaring bowl formation for deflecting the spreading mixture stream back into the conical fuel separator 142. The outward flare of the passageway 136 sharply reduces the velocity of the mixture stream at this point so that some separation of the fuel particles occurs in the upward flight through this passageway. The bowl-shaped entrance 143 is formed with an internal upwardly inclined, annular flange 146, and above this flange, in stepped sequence is a plurality of similar flanges 146'. Around each gutter or trough formed on the upper side of each flange 146' is a plurality of drain holes 147 extending downward through the annular body of the fuel separator and draining down on the outer wall of the separator. This separated fuel will run down and drip off the lower outer edge of the flared entrance 143 onto the heated surface 148 of the passageway 136. Any fuel particles which are not heated during their contact with this vaporizing surface 148 drain down along this inclined surface until they enter the carbureter 13, or until they are picked up by the velocity of the mixture stream and carried up through the separating process again. A heat insulating jacket 149 may be placed around the lower part of the fuel separator 142 for preventing the absorption of heat radiated from the vaporizing surface 148. As in the previous embodiment, the fuel separator 142 may be constructed of porcelain or other heat refractory material. Similarly, an accelerating well carbureter is preferably employed with the foregoing form of separator and vaporizer.

I claim:—

1. In combination, a housing having a fuel mixture inlet and an outlet, a conduit in said housing between said inlet and outlet thereof and having a bent surface for suddenly changing the direction of the mixture flow to thereby secure separation of fuel particles from the mixture stream, heating means for heating the flow of the fuel mixture through said housing, said conduit having openings above said heating means for draining the separated fuel particles from said conduit to said heating means to be there vaporized and then carried to the outlet with the mixture flowing through said housing.

2. In combination, a carbureter, an intake manifold, a bend of approximately streamlike contour whose entrance lines up with the discharge opening of said carbureter and whose outlet leads to said intake manifold, a surface heated by exhaust gases located beneath said bend and separate therefrom, means for preventing the transmission of heat from said heated surface to said bend, and a drain opening for precipitating the fuel collected in the bend at low velocities down onto said heated surface.

3. In combination, a mixture passageway comprising a fuel separating portion having a separating wall upon which the fuel is adapted to accumulate, said fuel separating portion collecting fuel particles on said wall by lowering the velocity of the mixture stream and changing its direction of flow through said separating portion, a fuel vaporizing surface removed from said separating portion, and a drain opening for discharging the collected fuel from said separating surface onto said vaporizing surface.

4. In combination, a housing comprising upper and lower housing sections, a substantially vertical intake in said housing, a substantially horizontal outlet from said housing, a separating elbow supported from the upper part of said upper housing section with one end aligned with the intake and the other with said outlet, an exhaust jacket for heating a portion of said lower housing section, and a thermally insulating gasket between said housing sections.

5. In combination, a housing having an inlet and an outlet, a fuel separating bend supported in said housing, said bend having its ends substantially aligned with said inlet and said outlet, said bend at its ends being separated from the housing inlet and outlet respectively to leave intervening spaces, the space between the end of said bend and said inlet being greater than the space between the end of said bend and said outlet, and a fuel vaporizing surface cooperating with said bend.

6. In a mixture supply apparatus for internal combustion engines, the combination of a mixture passageway comprising a fuel separating portion and a bend beyond said fuel separating portion, said fuel separating means having a greater separating action upon low air velocities than upon high air velocities, and a re-entrant curve or slope in said mixture passageway beyond said bend for redistributing the fuel particles in the mixture stream during the high air velocities.

7. In a mixture supply apparatus for internal combution engines, the combination of a mixture passageway, fuel separating means interposed therein comprising a fuel separating bend, a fuel vaporizing surface for receiving the fuel particles separated out in said bend, a second bend beyond said separating bend, said fuel separating bend having a greater separating action upon low air velocities than upon high air velocities, and a re-entrant slope posterior to said second bend for deflecting the fuel particles back into the mixture stream, particularly during the high air velocities.

8. In a fuel separator and vaporizer, the combination of a housing having a fuel mixture inlet and an outlet, a fuel separating duct within said housing between the inlet and outlet thereof, but spaced at all points from said housing walls. means for heating one of the walls of said housing, said heated wall being out of the path of fuel mixture flow through said duct, and means for permitting flow of fuel particles from said duct to said heated wall to be vaporized.

9. In a fuel separator and vaporizer, the combination of a housing having a fuel inlet and an outlet, a curved fuel separating duct having a divergent entrance and a convergent outlet disposed respectively at said housing inlet and outlet, said duct being spaced from said housing walls to leave a passage for the direct flow of mixture from said housing inlet to its outlet, and a heated wall below the lower wall of said duct for receiving fuel from said duct and vaporizing it.

10. In a fuel separator and vaporizer, the combination of a mixture passageway having a mixture inlet and outlet, a separator member in the form of an elbow conduit suspended in said passageway with its inlet and outlet ends exposed respectively to said passageway inlet and outlet, a hot wall below but spaced from said conduit, the vaporizing field above said wall receiving fuel particles from said conduit to effect vaporization thereof, said vaporizing field being in the path of direct flow through said passageway in shunt of said conduit.

In witness whereof, I hereunto subscribe my name this 20th day of September, 1923.

FRANK C. MOCK.